US007551560B1

(12) United States Patent
Duong-van et al.

(10) Patent No.: US 7,551,560 B1
(45) Date of Patent: Jun. 23, 2009

(54) METHOD OF REDUCING PACKET LOSS BY RESONANCE IDENTIFICATION IN COMMUNICATION NETWORKS

(75) Inventors: Minh Duong-van, Menlo Park, CA (US); Han C. Wen, San Jose, CA (US); Mark Crane, Reno, NV (US); Tomas J. Pavel, San Jose, CA (US)

(73) Assignee: OPNET Technologies, Inc., Bethesda, MD (US)

(*) Notice: Subject to any disclaimer, the term of this patent is extended or adjusted under 35 U.S.C. 154(b) by 716 days.

(21) Appl. No.: 09/846,451

(22) Filed: Apr. 30, 2001

(51) Int. Cl.
*H04L 12/26* (2006.01)
(52) U.S. Cl. .................... 370/232; 370/235; 370/252
(58) Field of Classification Search .......... 370/229, 370/230, 230.1, 232, 234, 235, 252, 253, 370/349, 395.4, 395.41, 468, 233
See application file for complete search history.

(56) References Cited

U.S. PATENT DOCUMENTS

| 5,367,523 | A | | 11/1994 | Chang et al. | |
|---|---|---|---|---|---|
| 5,400,329 | A | | 3/1995 | Tokura et al. | |
| 5,426,640 | A | | 6/1995 | Hlushyj et al. | |
| 5,439,483 | A | | 8/1995 | Duong-Van | |
| 5,583,792 | A | | 12/1996 | Li et al. | |
| 5,646,943 | A | | 7/1997 | Elwalid | |
| 5,751,969 | A | | 5/1998 | Kapoor | |
| 5,930,364 | A | | 7/1999 | Kim | |
| 5,995,488 | A | | 11/1999 | Kalkunte et al. | |
| 6,014,694 | A | * | 1/2000 | Aharoni et al. | 709/219 |
| 6,016,311 | A | * | 1/2000 | Gilbert et al. | 370/280 |
| 6,046,988 | A | | 4/2000 | Schenkel et al. | |
| 6,075,770 | A | | 6/2000 | Chang et al. | |
| 6,201,791 | B1 | | 3/2001 | Bournas | |
| 6,219,713 | B1 | | 4/2001 | Ruutu et al. | |
| 6,249,530 | B1 | * | 6/2001 | Blanco et al. | 370/468 |
| 6,390,922 | B1 | * | 5/2002 | Vange et al. | 463/42 |
| 6,466,979 | B1 | * | 10/2002 | Plouffe, Jr. | 709/226 |

(Continued)

FOREIGN PATENT DOCUMENTS

EP 0 817 433 A2 1/1998

(Continued)

OTHER PUBLICATIONS

John Nagle, "On Packet Switches with Infinite Storage," Network Working Group, Internet Engineering Task Force, RFC 970 (1985).

(Continued)

*Primary Examiner*—Chi H. Pham
*Assistant Examiner*—Shick Hom
(74) *Attorney, Agent, or Firm*—Robert M. McDermott, Esq.

(57) ABSTRACT

A control node of a communication network is operated at a packet bandwidth determined according to observations of performance metrics of the network at the control point. These performance metrics may be one or more of throughput, average fetch time and packet loss. The control node is operated so as to set a control bandwidth to corresponding resonance points of the performance metrics. The resonance points are determined by scanning across a range of control bandwidths, until one or more of the performance metrics is/are optimized. The packet bandwidth is set by varying an inter-packet delay time over selected communication links at the control node.

8 Claims, 3 Drawing Sheets

U.S. PATENT DOCUMENTS

| | | | |
|---|---|---|---|
| 6,477,143 B1 | 11/2002 | Ginossar | |
| 6,480,497 B1 * | 11/2002 | Flammer et al. | 370/400 |
| 6,532,214 B1 * | 3/2003 | Rumsewicz | 370/236 |
| 6,560,231 B1 * | 5/2003 | Kawakami et al. | 370/395.43 |
| 6,578,077 B1 * | 6/2003 | Rakoshitz et al. | 709/224 |
| 6,584,111 B1 | 6/2003 | Aweya et al. | |
| 6,600,721 B2 * | 7/2003 | Edholm | 370/232 |
| 6,614,763 B1 * | 9/2003 | Kikuchi et al. | 370/252 |
| 6,643,259 B1 | 11/2003 | Borella et al. | |
| 6,674,717 B1 * | 1/2004 | Duong-van et al. | 370/230 |
| 6,684,247 B1 | 1/2004 | Santos et al. | |
| 6,757,255 B1 | 6/2004 | Aoki et al. | |
| 6,766,309 B1 | 7/2004 | Cheng et al. | |
| 6,826,151 B1 | 11/2004 | Li et al. | |
| 6,925,068 B1 * | 8/2005 | Stanwood et al. | 370/329 |
| 6,947,381 B2 | 9/2005 | Wen et al. | |
| 6,990,071 B2 | 1/2006 | Adam et al. | |
| 7,072,297 B2 | 7/2006 | Grosdidier et al. | 370/231 |
| 2001/0015956 A1 | 8/2001 | Ono | |
| 2001/0021186 A1 * | 9/2001 | Ono et al. | 370/352 |
| 2001/0032269 A1 | 10/2001 | Wilson | |
| 2002/0099854 A1 * | 7/2002 | Jorgensen | 709/249 |
| 2002/0118649 A1 * | 8/2002 | Farley et al. | 370/252 |
| 2002/0118661 A1 | 8/2002 | Voce | |
| 2002/0141378 A1 * | 10/2002 | Bays et al. | 370/351 |
| 2002/0145981 A1 * | 10/2002 | Klinker et al. | 370/244 |
| 2002/0159386 A1 | 10/2002 | Grosdidier et al. | |
| 2002/0169880 A1 * | 11/2002 | Loguinov et al. | 709/228 |
| 2003/0193893 A1 | 10/2003 | Wen et al. | |

FOREIGN PATENT DOCUMENTS

| | | |
|---|---|---|
| WO | WO 00/02356 A | 1/2000 |
| WO | WO 01/76160 A1 | 10/2001 |

OTHER PUBLICATIONS

Van Jacobson and Michael J. Karels, "Congestion Avoidance and Control," Proceedings of SIGCOMM '88, ACM, Stanford, CA (Aug. 1988).

W. Richard Stevens, "TCP/IP Illustrated, vol. 1: The Protocols," Addison-Wesley Publishing Company, pp. iii-xiv and 275-322 (1994).

Gary R. Wright and W. Richard Stevens, "TCP/IP Illustrated, vol. 2: The Implementation," Addison-Wesley Publishing Company, pp. vi-xviii and 817-1005 (1995).

John P. Pippas, et al., "Shaping Aggregate LAN Flows for Transmission over ABR Connections," XP-000830899, Communication Networks, vol. 10, No. 1, pp. 45-56 (Jan. 1999).

Nguyen C. Trinh, et al., "Dynamic Resource Allocation for Self-Similar Traffic in ATM Network," XP-002169395, Proceedings APCC/OECC '99, pp. 160-165 (Oct. 18-22, 1999).

Brakmo, Lawrence, et al. "TCP Vegas: New Techniques for Congestion Detection and Avoidance" Copyright 1994 ACM 0-89791-682-4/94/0008 SIGCOMM 94- Aug. 1994 London England UK pp. 24-35.

\* cited by examiner

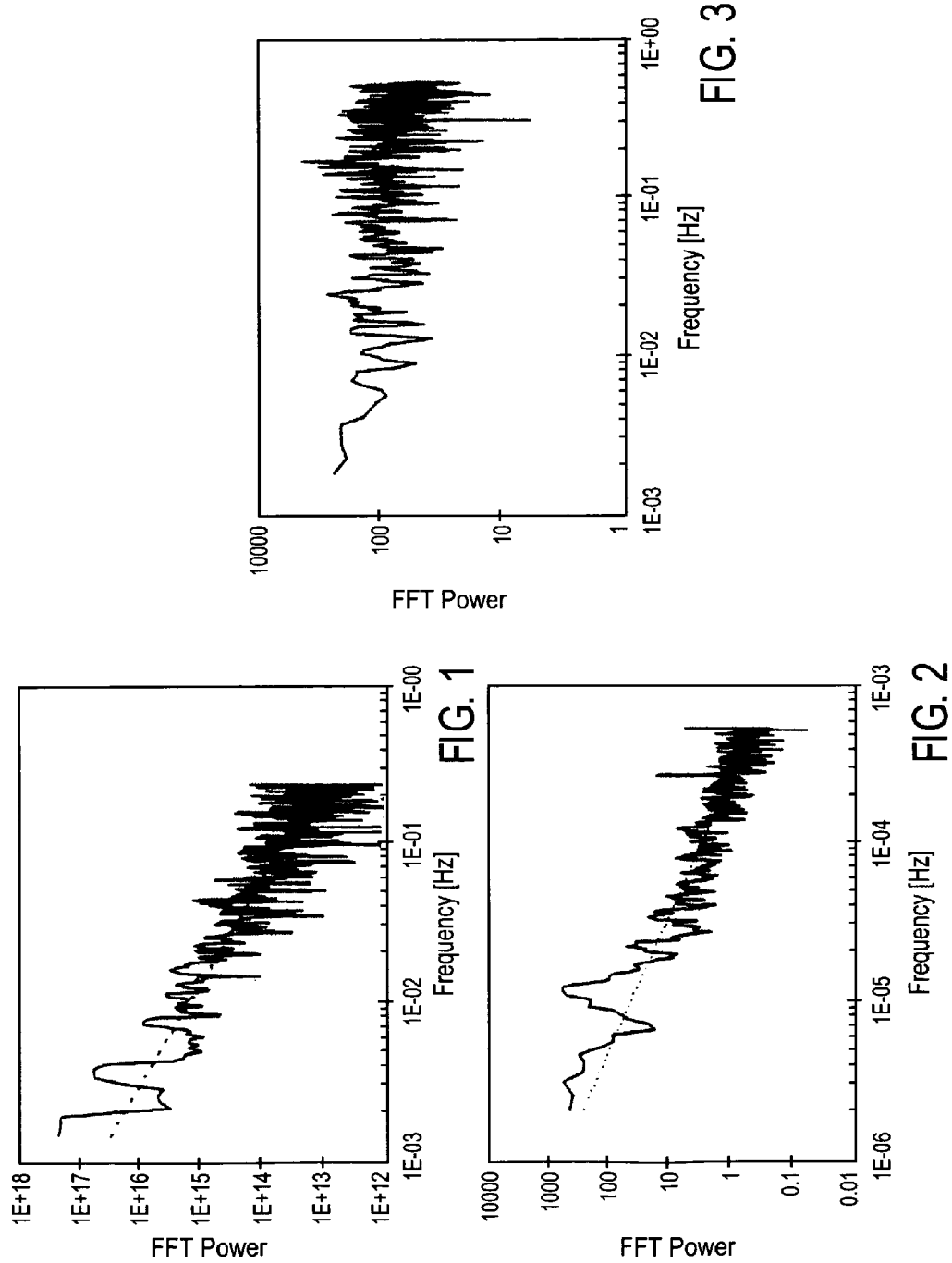

METHOD OF REDUCING PACKET LOSS BY RESONANCE IDENTIFICATION IN COMMUNICATION NETWORKS

FIELD OF THE INVENTION

The present invention relates to a scheme for operating a control node of a computer or other communication network that relies on packet switching techniques to transport information between nodes therein in order to reduce packet loss in the network.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Due to finite resources, packets may be dropped rather than queued.

In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begin to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows and more and more nodes become saturated. Eventually, even a successfully delivered packet may be retransmitted because it takes so long to get to its destination (whereupon it may be acknowledged by the destination node) that the source actually assumes that the packet was lost and tries to retransmit it. Under such circumstances, the effective capacity of the network can be virtually zero.

Contrary to what one might believe, the solution to this problem is not simply to allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

It is clear that catastrophic network failures due to congestion should (indeed, must) be avoided and preventing such failures is the task of congestion control processes within packet switched networks. To date, however, the object of such congestion control processes has been to limit queue lengths at the various network nodes so as to avoid throughput collapse. Such non-TCP techniques require the transmission of some control information between the nodes and this overhead itself tends to limit the available network bandwidth for data traffic. Nevertheless, a good congestion control process maintains a throughput that differs from a theoretical ideal by an amount roughly equal to its control overhead.

Even these "good" congestion control processes, however, are not good enough. Studies of traffic flow across the Internet show that bandwidth of the various communication links is underutilized even in the presence of congestion. That is, even though excess capacity exists on the communication links that couple various nodes of the Internet to one another, packets are still being dropped within the network. One reason that conventional congestion control processes have failed in this fashion is that such processes do not take into account the true nature of network traffic.

SUMMARY OF THE INVENTION

A control node of a communication network is operated at a packet bandwidth determined according to observations of performance metrics of the network at the control point. These performance metrics may be one or more of throughput, average fetch time and packet loss. The control node is operated so as to set a control bandwidth to corresponding resonance points of the performance metrics. The resonance points are determined by scanning across a range of control bandwidths until one or more of the performance metrics is/are optimized. The packet bandwidth is set by varying an inter-packet delay time over selected communication links at the control node.

BRIEF DESCRIPTION OF THE DRAWINGS

The present invention is illustrated by way of example, and not limitation, in the figures of the accompanying drawings in which like reference numerals refer to similar elements and in which:

FIG. 1 shows the Fourier power spectrum of traffic generated from a Pareto distribution of file sizes that is not subjected to the TCP protocol.

FIG. 2 shows the Fourier power spectrum of uncongested and under-supplied traffic that is subjected to the TCP protocol.

FIG. 3 shows the Fourier power spectrum of congested and over-supplied traffic that is subjected to the TCP protocol.

FIG. 5A is a plot showing the improvement in throughput as a function of control bandwidth that is experienced after the control processes are applied, FIG. 5B is a plot showing the improvement in packet loss as a function of control bandwidth that is experienced after the control processes are applied and FIG. 5c is a plot showing the improvement in average fetch time as a function of control bandwidth that is experienced after the control processes are applied.

DETAILED DESCRIPTION

Figure 4:
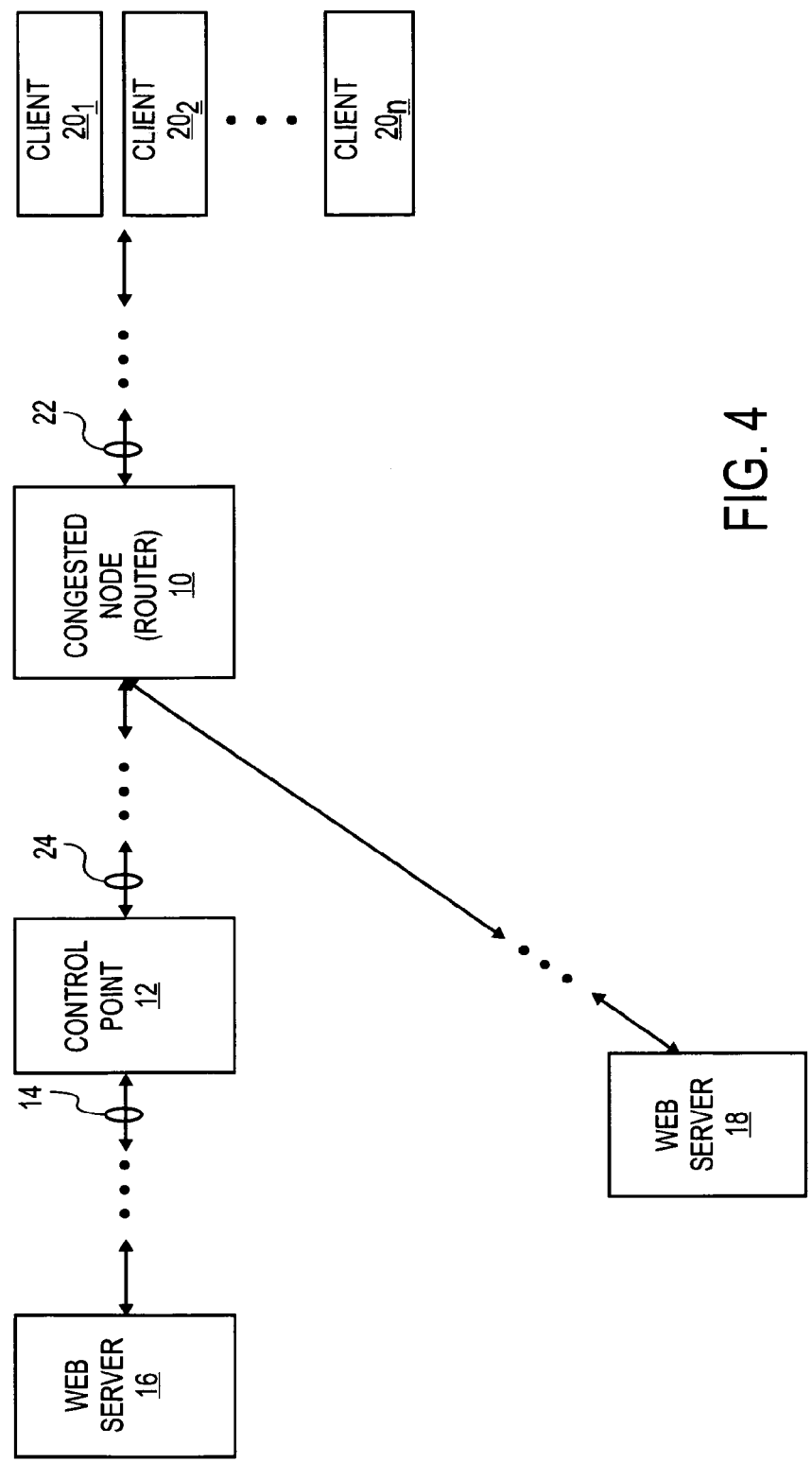
FIG. 4 illustrates an example of a computer network having a control node upstream of an otherwise congested node in accordance with an embodiment of the present invention.

A scheme for operating control nodes of a computer or other communication network that utilizes packet switching techniques is disclosed herein. As discussed in greater detail below, the present scheme allows for control nodes to be operated at points that correspond to instances of minimum packet loss (maximum throughput) for given network traffic conditions. These same control points also correspond to instances of minimum fetch time, thus allowing for improved user experience (i.e., by reducing the time needed to download content from a content site). Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope. It should also be noted that as used herein the term "packet" is meant to broadly refer to packets, cells and other forms of information units used to transport data and/or control information within communications infrastructures (e.g., computer networks, telecommunications networks, data communication networks and the like, for example, the Internet) wherein resources are shared among multiple users and multiple information or traffic streams. The present control techniques may be applied at a per connection, per traffic stream or other level.

Existing congestion control approaches have generally viewed network traffic (e.g., the generation of new packets to be injected into a network) as essentially random processes. However, recent work in the area of traffic modeling has shown that network traffic is in fact chaotic in nature. None of the currently proposed congestion control methodologies capture or exploit this characteristic.

Other studies from the academic community have shown that the time series of network traffic throughput is not Poisson, but fractal. Namely, the "bursty" behavior seen in a time series at a given time scale is also seen at all other time scales. This "self-similarity" is one of the signatures that characterize a fractal time series. However, the present applicants have discovered that this "self-similar" signature is not present for heavily congested network traffic. The present applicants have verified that the traffic generated without any TCP protocol exhibits a fractal time series if the files transmitted are drawn randomly from a Pareto distribution of file sizes. The Fourier power spectrum in this case is a power law that on a log-log scale is linear, as shown in FIG. 1. This power law behavior is another signature of a fractal time series. The present applicants have also discovered that traffic flow with TCP protocol is also fractal, but only if the network topology is under-supplied with traffic. In this situation, the only significant portion of the TCP protocol responsible for the traffic dynamics is the receiver's window size. See FIG. 2. However, when the network topology is congested with traffic, the packet losses coupled with the non-linearity of the TCP congestion avoidance algorithm results in a time series that loses its fractality and multi-fractality. The corresponding Fourier power spectrum shows no power law behavior and is shown in FIG. 3. Even though the time series is not fractal, it is still chaotic.

The term "chaos" is used to describe the apparently random behavior exhibited by many deterministic nonlinear dynamical systems. Such systems manifest a rather remarkable phenomenon in that their deterministic property implies that all future states are determined from the present state. Thus, on one hand there is complete future knowledge of the system, while on the other there is seemingly random motion.

Chaos then is the long-term aperiodic behavior of a deterministic, nonlinear, dynamical system that exhibits sensitivity to initial conditions. A periodicity is the property that orbits never repeat themselves exactly; however they may get arbitrarily close to doing so, as observed in periodic windows. The other, perhaps more important, property is the sensitivity of the system to tiny perturbations. Consider two given points in phase space that are distinct but lie arbitrarily close to each other, then one might assume that their orbits will remain close forever. In fact, just the opposite is observed; the orbits separate exponentially in a bounded region of state space.

As indicated above, current congestion control processes simply do not take the chaotic network traffic characteristics into account and, therefore, cannot be expected to be optimum solutions to the congestion problem. What is needed therefore, is a congestion control scheme that does account for the chaotic nature of network traffic flow.

To more fully appreciate the present methods of traffic control, it is helpful to understand why network traffic is chaotic in nature. Consider then a series of packet transmissions between a source and a receiver. Suppose these transmissions take place across one or more networks, through one or more intervening nodes, such as switches and/or routers. Suppose further that the transmissions are controlled using the well-known transmission control protocol (TCP), as is true for most transmissions that take place across the Internet.

Very early in the development of the modern Internet, it was discovered that some control over the manner in which packets were injected into the network by the source was needed. Originally, TCP allowed a source to inject multiple packets into a network, up to a limit corresponding to a window or buffer size advertised by the receiver. Although such a scheme may work where the source and the receiver are connected to the same local area network, it was soon found that where routers having finite buffer sizes are disposed between the source and the receiver, problems arise as these routers soon run out of space to hold the incoming packets. To combat this problem Jacobson and Karels developed a "slow start" procedure wherein the source limits the rate at which it injects new packets into the network according to the rate at which acknowledgements of successful receptions are returned by the receiver. Van Jacobson and Michael J. Karels, "Congestion Avoidance and Control", Proceedings of SIGCOMM '88 (Stanford, Calif., August 1988), ACM.

Under the slow start procedure, a so-called congestion window is added to the source's TCP implementation. When a connection is established with a resource on another network, this congestion window is initialized to one segment (e.g., the segment or packet size advertised by the resource or a default packet size). Each time an acknowledgement is received, the congestion window is incremented and the source is allowed to inject a number of packets up to the minimum of the current congestion window size or the receiver's advertised window. Over time, the source's congestion window will grow exponentially until at some point the capacity of the intervening network is reached and some intermediate router begins dropping packets. This is an indication to the source that its congestion window has gotten too large. See, e.g., W. Richard Stevens, TCP/IP Illustrated, Vol. 1: The Protocols (1994) and Gary W. Wright and W. Richard Stevens, TCP/IP Illustrated, Vol. 2: The Implementation (1995).

At this point, and where the slow start process is run in concert with a conventional congestion avoidance procedure, the source resets its congestion window to one, and the process repeats up to the point at which the congestion window becomes half the size at which packet loss occurred previously. After this point, the congestion avoidance process takes over and begins incrementing the congestion window in a linear fashion (rather than in an exponential fashion as under the slow start process) in response to receiver acknowledgements.

This sudden change from an exponentially growing number of packets being injected to a linearly growing number of packets being injected presents a discontinuity. Such discontinuities are observed at the intervening router for each of the connections it is servicing. Moreover, the discontinuities appear at random as there is no synchronization between the different sources injecting packets into the network. It is the interaction between the discontinuities that result from the operation of the TCP and the randomness at which they are manifest at the routers within the network that gives rise to the chaotic nature of network (e.g., Internet) traffic.

While investigating the phenomena described above, the present applicants have discovered a technique for controlling congestion in such networks. In brief, a control point in a network is established and throughput between a traffic source feeding the control point and some downstream point (or points) is monitored. The monitoring is performed so as to identify so-called "giant resonance peaks" for a flow of packets from one or more traffic sources feeding the control point. These resonance peaks may be detected by examining the throughput or fetch times associated with a traffic stream or connection, and performing control bandwidth scans. The control point may then be operated so as to allow the network to maintain desired throughput. This operating point will also correspond to a minimized packet loss and a minimized fetch time (i.e., the time taken to download a desired file). In essence, this method exploits the nonlinear dynamics of the chaotic flows of the network traffic; something which conventional congestion control processes simply do not do.

Under the present scheme, the end-to-end packet losses of one or more traffic streams transmitted across a congested network may be reduced by controlling the bandwidths (i.e., the inter-packet delay) of the corresponding traffic streams applied to downstream node(s) of the network from one or more control points along the network topology. This reduction in packet loss results in a reduction in fluctuations or variability of the controlled traffic streams, an increase in bandwidth utilization of a congested link at downstream points and a reduction in times to transmit files (e.g., to an end-user).

FIG. 4 illustrates an example of the use of a control device upstream of an otherwise congested network node in accordance with an embodiment of the present scheme. The otherwise congested node 10 is downstream of an upstream control node 12, which receives traffic (e.g., bursty HTTP (hypertext transfer protocol) traffic) on one or more communication links 14 from a web server 16. In other embodiments, control node 12 may be integrated in node 10 at the appropriate input or output thereof or may even, in some cases, be used downstream of node 10. Node 10 also receives traffic from one or more uncontrolled traffic sources, such as web server 18. Node 10 provides traffic to one or more clients $20_1$, $20_2$, ... $20_n$ across one or more communication links 22.

To provide for reduced congestion on communication link 22, which is an output from node 10, the output bandwidth (e.g., packets/time interval) from the control node 12 is limited to a value determined from monitoring the downstream congestion conditions. That is, by varying the rate of traffic transmitted on communication link 24, which couples the output of node 12 to an input of node 10, for example by controlling the delays between packets, downstream congestion control is achieved.

Figure 5A:
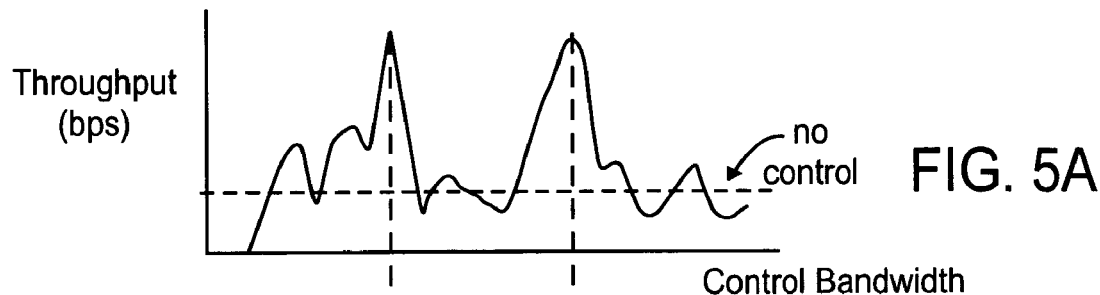
FIGS. 5A, 5B and 5C are graphical representations of improvements that may be experienced within the network of FIG. 4 after application of the control technique which is an embodiment of the present invention, in particular.
Figure 5B:
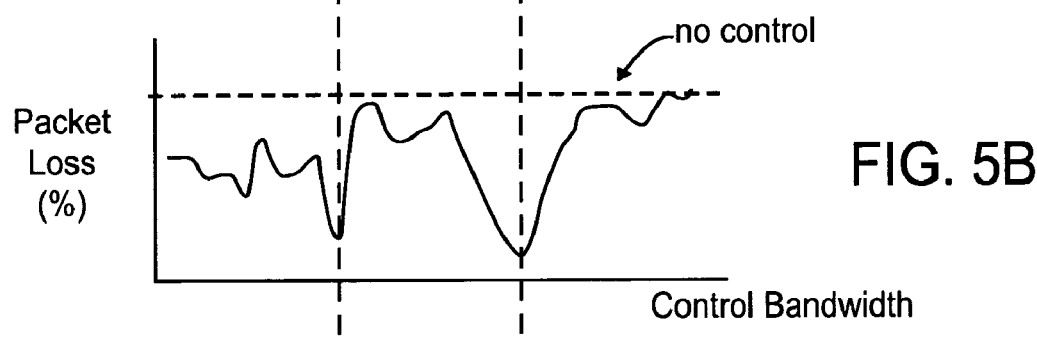
Figure 5C:
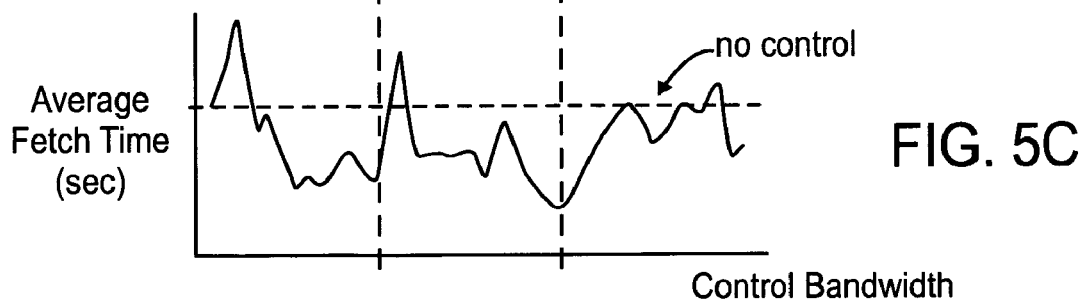

To understand how the present control mechanisms operate, consider the graphs of traffic flows shown in FIGS. 5A, 5B and 5C. FIG. 5A illustrates the end-to-end throughput for traffic input to control node 12 as a function of the controlled bandwidth of the output of node 12. In this case, controlled bandwidth refers to a controlled rate of output from node 12. The horizontal dashed line in the graph illustrates the throughput conditions when no control is applied at node 12. Although throughput is linear, it is well below the maximum capacity of the communication links. As shown in FIGS. 5B and 5C, this leads to a significant rate of packet loss and a fairly long average fetch time (see the dashed line curves in these illustrations).

However, when control is provided at node 12 (i.e., when inter-packet delay times are controlled at this node by adjusting buffer occupancy times/levels), significant improvements in all three areas can be noticed. By examining the graph of throughput (FIG. 5A), it is apparent that there are multiple points of significantly improved performance. These are the so-called giant resonance points for the network illustrated in FIG. 4. Although only two points of resonance are shown, other networks may exhibit different (and perhaps more complex) resonance signatures. Note that these resonance points correspond to instances of improved packet loss (FIG. 5B) and reduced average fetch time (FIG. 5C).

These curves point out that for given "cross-traffic" conditions (i.e., traffic form uncontrolled streams received at node 10), there will be resonance points at which the output bandwidth of the traffic on communication link 24 from node 12 will maximize end-to-end throughput for that traffic. This will be a point at which little or no packet drops will occur and may represent a preferred operating point for the network from the point of view of those users that are transmitting traffic over one of the controlled streams 14. Of course, because the network is dynamic in nature, the resonance points change frequently, depending on the traffic conditions on the uncontrolled streams. The present applicants have determined a scheme for finding the resonance points and then allowing traffic on the controlled streams to be throttled accordingly so as to maximize throughput for those streams.

The value of the controlled bandwidth can be set by controlling the buffer occupancy at node 12 (and changes thereto). When a resonance point is found, the corresponding buffer occupancy value is used as the output bandwidth over communication link 24 and packets are buffered at node 12 accordingly. Periodically, node 12 can reassess whether the resonance point has shifted and change the control bandwidth accordingly. In this way, downstream congestion is minimized and fewer packets are expected to be lost.

One might undertake to determine the resonance points using a variety of techniques. For example, an algorithmic search could be used. Another possibility is to use a search that sweeps from a low control bandwidth to a higher control bandwidth. Still another technique is to implement a search process that begins at a maximum value and ramps down. That is, control node 12 searches for the present resonance points of the control bandwidth by beginning at a maximum value and then decreases the bandwidth until an inflection point in any of the performance metrics (e.g., throughput, average fetch time or packet loss) is observed, thus indicating that a resonance point has been reached. A preferred search process may look for several resonance points over a selected range of control bandwidth and then choose an operating value for the control bandwidth that corresponds to a best observed resonance point. Other methods of estimating the resonance point are disclosed in commonly-owned U.S. patent application Ser. No. 09/846,450, entitled "METHOD FOR DYNAMICAL IDENTIFICATION OF NETWORK CONGESTION CHARACTERISTICS", filed Apr. 30, 2001, which was issued Jul. 4, 2006 as U.S. Pat. No. 7,072,297, and U.S. patent application Ser. No. 09/854,321, entitled "METHOD FOR DETERMINING NETWORK CONGESTION AND LINK CAPACITIES", filed May 11, 2001, which was issued Jul. 24, 2007 as U.S. Pat. No. 7,248,564, each of which are incorporated herein by reference.

Thus a scheme for operating a control node in a computer network has been described. By reducing the end-to-end packet loss using the present control mechanisms, traffic flow across the entire network topology is improved. The control methodology described herein can be applied on a port-by-port, link-by-link and/or traffic flow-by-traffic flow basis. That is, the control methods can be introduced at the physical or logical level, allowing true end-to-end quality of service (QoS) to be provided. It should be remembered that although the foregoing description and accompanying figures discuss and illustrate specific embodiments, the broader scope of present invention should be measured only in terms of the claims that follow.

What is claimed is:

1. A method, comprising:

operating a control node of a communication network at a packet bandwidth wherein the control node coupled to a network node is located in a communication link between at least one server and at least one client, determining at least one resonance state of a performance metric that exhibits improved network performance metrics at the control node by monitoring the performance metric while scanning across a range of bandwidths of the control node until the at least one resonance state of the performance metric is observed, the at least one resonance state indicating that one or more of the network performance metrics is optimized, and setting said packet bandwidth of the control node to a value that corresponds to the at least one resonance state of the performance metrics that is optimized, wherein the packet bandwidth is set by varying an inter-packet delay time over selected communication links at the control node.

2. The method of claim 1, wherein the network performance metrics comprise one or more of throughput, average fetch time and packet loss.

3. The method of claim 1, wherein said resonance state is a best observed resonance state from the at least one resonance state.

4. A method, comprising:

determining at least one resonance state of a performance metric that exhibits improved network performance metrics at a control node coupled to a network node inside a communication network by monitoring the performance metric while scanning across a range of bandwidths of the control node until the at least one resonance state of the performance metric is observed indicating that one or more of the network performance metrics is optimized; and operating the control node within the communication network at a packet bandwidth, wherein the packet bandwidth is set to a value that corresponds to the at least one resonance state of the performance metric that is optimized, wherein the control node is located in a communication link between at least one server and at least one client, wherein the packet bandwidth is set by varying an inter-packet delay time over selected communication links at the control node.

5. The method of claim 4, wherein the network performance metrics comprise one or more of throughput, average fetch time, and packet loss.

6. The method of claim 4, wherein said resonance state is a best observed resonance state from the at least one resonance state.

7. An apparatus to control congestion in a communication network, wherein the apparatus comprises:

a control node coupled to a network node, wherein the control node is located in a communication link between at least one server and at least one client, wherein the control node is to determine at least one resonance state of a performance metric that exhibits improved network performance metrics, wherein the at least one resonance state is determined by monitoring the performance metric while scanning across a range of bandwidths of the control node until the at least one resonance state of the performance metric is observed, the at least one resonance state indication that one or more of the performance metrics is optimized, wherein the control node operates at a packet bandwidth, wherein the packet bandwidth is set to a value that corresponds to the at least one resonance state of the performance metric that is optimized, and wherein the packet bandwidth is set by varying an inter-packet delay time over selected communication links at the control node.

8. The apparatus of claim 7, wherein said resonance state is a best observed resonance state from the at least one resonance state.

* * * * *